United States Patent Office 2,922,726
Patented Jan. 26, 1960

2,922,726

FLAME-PROOFING NYLON WITH THIOUREA CONTAINING RESIN

Louis J. Moretti, Somerville, N.J., and William N. Nakajima, New York, N.Y., assignors to American Cyanamid Company, New York, N.Y., a corporation of Maine No Drawing. Application March 18, 1955
Serial No. 495,326

2 Claims. (Cl. 117—137)

The present invention relates to a treatment of textile materials to produce a flame-retardant resin finish, as well as to the resulting treated fabric.

Textile fabrics have been treated with a wide variety of thermosetting resins to produce a diversity of resin finishes on the cloth. Among the many objects have been resistance to shrinking, resistance to wrinkling, the stiffening of limp fabrics and reducing the combustibility of the material. The commoner varieties of textile resins include water-soluble condensation products of formaldehyde with urea or melamine and the ethers obtained by treating the aforesaid condensation products with methanol. Water-soluble unalkylated thiourea-formaldehyde resins have also been proposed for flameproofing nylon. As might be expected, the resin finishes used to produce or improve one desirable effect on a textile fabric occasionally have an undesirable effect on other qualities of the material. In addition, the various resins have peculiarities which in one manner or another limit their use.

Thiourea-formaldehyde resins have often been considered as equivalents of urea-formaldehyde condensates; and while this is no doubt true for some varieties of resins, it is not the case with water-soluble resins, both in respect to their preparation and their stability as partial condensates in aqueous solution. For example, when a mol of thiourea is refluxed with formaldehyde in quantities of the order of 1.33 and 2.3 mols, it has been found that the reaction mixtures hydrophobe upon dilution with water after relatively short reaction periods. Yet, under the same conditions, urea-formaldehyde mixtures can be refluxed considerably longer and still yield partial condensates of a water-soluble and a water-dilutable nature. Moreover, even when water-soluble thiourea-formaldehyde resins are obtained, they have a serious drawback in their lack of stability, especially in concentrated solutions, which is manifested by a tendency to precipitate as crystals, or even more so in respect to hydrophobing upon dilution with water. As a result, it has been customary to prepare the water-soluble variety of these resins immediately prior to their use. This has, of course, limited their utility greatly since many potential users lack the skill and equiment for the manufacture of resins. While numerous water-insoluble or hydrophobic precondensates have been prepared with thiourea, formaldehyde, and an alcohol as adhesives and for molding purposes, etc., there has been no suggestion that a stable, hydrophilic or water-dilutable resin of relatively low formaldehyde content could be prepared in this manner. Relatively large proportions of formaldehyde, as for example a 3:1 formaldehyde:thiourea molar ratio, have been employed to solubilize or stabilize such resins at least temporarily. However, this practice is objectionable for many purposes, inasmuch as an aqueous solution of the resins contains a relatively large amount of free formaldehyde which is extremely annoying and is a health hazard to operators working around the open pad baths which are conventionally employed in textile finishing. In addition, the presence of excessive quantities of free formaldehyde in resins employed in the treatment of textiles results in unsalable products having a fish odor even after the resin-treated fabric is cured and subjected to a process wash.

An object of the present invention is to provide improved textile materials.

Another object of the invention is to provide an improved method for imparting a flame-retardant finish to textiles.

A further object of the invention is to provide an improved method for producing a wrinkle-resistant finish of lower flamability on textile material.

Still another object of the invention is to provide a method for imparting a flame-retardant finish for hydrophobic synthetic textile fabrics.

Yet another object of the invention is to provide a method of imparting a flame-retardant finish in combination with a stiff hand on textile materials containing a substantial proportion of nylon fibers.

Other objects and advantages of the present invention will be apparent to those skilled in the art upon consideration of the detailed disclosure hereinbelow.

The present invention is concerned with impregnating a textile material with an aqueous solution of a halide salt curing agent and a water-soluble resinous composition of the nature described hereinbelow. Narrower aspects of the invention include treatments employing specific resins and preferred proportions, as well as the finishing of textile materials containing a substantial proportion of thermoplastic hydrophobic synthetic fibers, and especially nylon fibers.

The resinous mixtures which are cured to the water-insoluble state during the process of this invention comprise the water-soluble hydrophilic products of treating at a temperature above about 45° C. and pH between about 4.0 and about 6.0 relative proportions of at least about 0.4 mol of a water-soluble aliphatic monohydric alcohol per mol on a monomeric basic of a hydrophilic aldehyde condensate of thiourea in which the reaction is halted after a substantial amount of alcohol has reacted and before a sample of the reaction mixture hydrophobes upon dilution with 50 volumes of water at 20° C., and one or more hydrophilic water-soluble urea derivatives of the group consisting of the monomers and lower polymers of methylol urea and lower alkyl ethers thereof in proportions such that said urea derivative has an urea content between about 0.6 and about 7.0 parts by weight per part of original thiourea. The methylol ureas and their ethers may, of course, be employed as mixtures in the form of monomers and/or lower polymers.

The present process is suitable for producing a number of effects on various fibrous materials. It is particularly designed to produce a durable fire-retardant stiff finish on net or other open-mesh fabrics containing at least a substantial (e.g., 20% by weight) and desirably a major proportion of at least 50% of nylon of both the adipamide and caprolactam types. While the application of the present resins with any of the conventional acid curing catalysts is contemplated for any fibrous textile materials, including inter alia, cotton, viscose rayon, wool, polyester fibers, as exemplified by polyethyleneglycol terephthalate, and the various known homo- and copolymers of acrylonitrile with compatible monomers, including 2-methyl 5-vinyl pyridine, other vinyl pyridines, vinyl acetate, and methyl acrylate, and blends of such materials in order to provide a different hand, etc., little or no flame resistance is produced by the finish.

It is frequently desirable to stiffen nets and other lacy nylon fabrics in order to meet the dictates of fashion. The customary method of producing the desired stiff hand on such lightweight open-mesh materials is a comparatively heavy treatment with a conventional thermosetting resin such as melamine-formaldehyde which is cured on the fabric. Unfortunately, these resin treatments have increased the combustibility of the fabrics since the resin-treated nylon fibers do not melt when burning and drop away from the fabric as in the case of untreated nylon net fabric. Thus, the resin treatment serves to preserve the structure of the flaming fabric and thereby aid in the propagation of flame through the open-mesh material. The present process results in flame-retardant nylon nets which melt when held in a flame and accordingly do not leave an open, lacy structure suitable for spreading the flame.

When a stiff hand is sought on such nets and other lacy fabrics, it is recommended that the add-on or pickup of the resin solids employed here should amount to at least about 50% based on the untreated fabric weight, whereas 5 to 20% is adequate for various tightly woven or knitted nylon materials. While the novel finishing process is chiefly intended for application to woven or nonwoven textile fabrics, including knitted and felted materials, it is also contemplated that it may be applied to raw fibers, rovings, yarns, and threads at any stage in their manufacture.

It has been found that a special group of catalysts is required in the new textile finishing process in order to obtain a superior degree of flame retardance. These accelerators all contain a halide salt, which expression is used herein in its general sense to also include hydrohalide salts. Among the many suitable catalysts are the amine and alkylolamine hydrochloride and hydrobromide salts, as exemplified by the hydrochloride salt of mixed isopropanolamines, and the hydrochloride salt of 2-methyl 2-aminopropanol-1, as well as a wide variety of the bromides and chlorides of metals and especially those in group II of the periodic table of elements in addition to ammonia. Ammonium chloride and bromide are recommended for the best results; but zinc bromide, magnesium chloride, magnesium bromide, calcium bromide, strontium chloride, and barium bromide can also be employed. To avoid tendering of the fabric or discoloration of brighteners, the accelerator should generally be used in quantities ranging from about 0.5 to about 6.0% based on the weight of resin solids, and desirably below about 3.5 in general and below about 2.0% for solutions containing 40 or more percent resin solids. Strangely enough, some of the more common accelerators for textile resins fail to produce the desired flame-retardant finish on nylon, even though they are incombustible themselves and have even been used in fireproofing treatments, as is the case of diammonium hydrogen phosphate and ammonium sulfate. The cause of this peculiar effect is not known.

The resin mixtures employed in the present process and their preparation are fully described in the concurrently filed application, Serial No. 495,324, now Patent No. 2,881,153, of W. F. Herbes and R. Polansky. It was found that thiourea-aldehyde condensates were stabilized against hydrophobing and crystallization in aqueous solutions by treatment with an alcohol and that a further stabilizing effect was obtained by blending a resin derived from urea with the alcohol-treated thiourea-aldehyde condensate. This blending of the resins may be performed either before or after the alcohol treatment. However, the reaction conditions are far less critical when the alkylation or alcohol treatment is performed on the mixed resins rather than the thiourea-aldehyde condensate alone, inasmuch as the latter treatment requires an acidity within the narrow range of pH values from about 4.5 to about 5.6 and the maintenance of the temperature in the similarly restricted range from about 45 to about 65° C.

By the alcohol treatment of the blended condensates, resins containing substantial amounts of thiourea-aldehyde condensates are stabilized or inhibited against both hydrophobing, which term is used herein to denote precipitation upon diluting 1 part of the sample with 50 parts of water at 20° C., and against crystallization or separation in the diluted resin solution for comparatively long periods. Hydrophobing is generally attributed to an increase in molecular weight resulting from condensation polymerization, and it must be avoided at all stages in the preparation of the resins employed here. In preparing the hydrophilic condensates which are subjected to the alcohol treatment, a wide variety of water-soluble aldehydes may be employed, including formaldehyde, acetaldehyde, propionaldehyde, glyoxal and the like. Formaldehyde is preferred for the purpose, especially in its more concentrated forms, such as paraformaldehyde and hexamethylene tetramine, in order to minimize the amount of water introduced into the mixture when a heavy pickup is desired in textile finishing. However, formalin or other formaldehyde-engendering substances may often be employed. The expression "formaldehyde" is used herein in a generic sense to denote not only formaldehyde, but also its polymers, formaldehyde-engendering substances and other formaldehyde equivalents, inasmuch as these all form formaldehyde momentarily during the condensation reaction.

A hydrophilic thiourea-aldehyde condensate is required for the alcohol treatment, and this may be obtained by reacting at least about 1.0 mol of formaldehyde per mol of thiourea at a pH above 7. Suitable reaction conditions are a pH between about 7.2 and about 10.5 and a reaction temperature above about 45° C. for a period of about 15 minutes to about 2 hours, so long as there is no hydrophobing of a sample when diluted with 50 volumes of water at 20° C. When urea is also present with the thiourea during this reaction with formaldehyde, the reaction mixture may be heated above about 70° C., as for instance by refluxing (about 95° C.) or at even higher temperatures under elevated pressures. This methylolation may be and preferably is carried out in the presence of the alcohol which is later reacted with the condensate under the specified acid conditions.

A water-soluble monohydric aliphatic alcohol is required in preparing the resins. Among the suitable compounds are methanol, ethanol, propanol, and isopropanol, as well as mixtures thereof. Methanol is greatly preferred for the purpose, as it enhances the hydrophilic characteristics of the product and is cheap and readily available. Higher alcohols are unsatisfactory since they decrease the hydrophilic characteristics.

The textile-treating compositions also include a compatible urea-containing component. Among the suitable water-soluble and water-dilutable or hydrophilic urea derivatives are the monomers and lower polymers of methylol urea and lower alkyl ethers thereof with alcohols containing from 1 to 3 carbon atoms. These include monomethylol urea and dimethylol urea, as well as the mono- and diethers of the aforesaid compounds. Although the ethers of ethanol, propanol, and isopropanol are also contemplated, the methyl ethers of the urea compounds are recommended as having the best solubility characteristics. The lower polymers of the aforementioned materials, that is those having molecular weights sufficiently low to be hydrophilic or water-soluble, are also suitable constituents. The urea content, regardless of whether it is present as urea or various derivatives thereof, should be within the range of between about 0.6 and about 7.0 (preferably not over 4.0) parts by weight of original urea per part of original thiourea. While the urea derivative may be introduced into the thiourea-aldehyde condensate at the time of the reaction with alcohol, it is usually preferred to react urea per se with formaldehyde in the presence of thiourea or a thiourea-aldehyde condensate prior to the reaction involving the alcohol under acid conditions. For example, one method is to react from 1.0 to 2.3 mols of paraformaldehyde with 1 mol of a mixture of urea and thiourea in the proportions set forth above at a pH of 7.2 to 8.5 in the presence of 1.3 mols of methanol for a period of one to three hours at reflux temperatures of the order of 95° C. to form probably essentially a mixture of methylol ureas and thioureas. Formic acid is then introduced to change the pH to between 4.0 and 6.0 and refluxing is then continued for between 15 minutes and two hours to probably produce methyl ethers of the methylol ureas and methylol thioureas. After this, the reaction is halted by adding 50% aqueous sodium hydroxide to raise the pH to between 7 and 9, and the mass is cooled and clarified by means of a pressure filter.

From the various modifications set forth in the aforementioned application in respect to the preparation of the blended resins, it is apparent that the aldehyde may be introduced at several points in the methylolation reactions and that considerable excesses of aldehyde in the reaction mixture are permissible before the addition of the last resin-forming material, e.g., thiourea or urea. However, it is highly desirable to keep the total aldehyde content of the reaction mixture between 1.0 and 2.3 mols per mol of resin-forming material during the alcohol reaction. The expression "total aldehyde" is used to include both the free aldehyde and the aldehyde which has combined with one or more of the resin-forming substances. These two forms are in equilibrium in the reaction mixture; and, in general, the free aldehyde concentration increases with an increase in the total aldehyde present. When the total aldehyde content exceeds 2.3 mols on the given basis, the free aldehyde is excessive; and a fabric treated with this resin has an undesirable odor, even after it has been thoroughly cured and subjected to a process wash. Moreover, large excesses of an aldehyde are not necessary to achieve a stabilizing or solubilizing effect on the thiourea-aldehyde condensate, inasmuch as a high degree of stability is produced by the alcohol treatment and the blending of the resin mixture in proper proportions.

In the alcohol treatment, the alcohol may suitably be present in proportions ranging from about 0.4 up to about 8 or more mols (at least 0.8 being generally preferred) per mol of the original thiourea, that is per mol of thiourea employed in preparing the precondensate with an aldehyde. Large excesses appear to do no harm but are not required, and sometimes they may occasion an extra step of removing unreacted alcohol by distillation under subatmospheric pressures. For a concentrated resin solution, it is recommended that from 1.0 to 1.3 mols of alcohol be used per mol of the total mols of thiourea and urea taken. The pH during the alcohol reaction may be between about 4.0 and 6.0 and preferably between 4.5 and 5.6. When the reaction mixture contains both the thiourea and urea derivatives, results are somewhat different than when a thiourea compound alone is treated because a larger molar ratio of alcohol combines. For example, between about 0.1 and about 1.4 mols of alcohol may combine per mol of thiourea and urea taken. This treatment has been postulated as an alkylation or etherification by condensation of the alcohol with one or more of the hydroxyl groups in the methylol radicals of the thiourea and urea derivatives; but this has not been established with certainty. However, it is apparent that the thiourea-formaldehyde compounds combine with or are converted in some way by the alcohol. It is estimated in treating the mixed condensates that the extent of alkylation of the thiourea derivative is from about 10 to about 30%, and possibly even more, of the available methylol groups thereon. The preferred stage of reaction ranges from about 0.1 mol to about 0.7 mol of alcohol per mol of thiourea plus urea taken; but the resin mixture may contain as much as 1.8 mols of combined alcohol on the same basis where the thiourea and urea derivatives are alkylated separately, as this permits a higher alkylation of the urea compound.

The time of the alcohol reaction varies inversely with the severity of the reaction conditions and is usually between about 15 minutes and about two hours. When any process variables are changed, the proper reaction time should be determined by experimenting with the dilution of small samples of the reaction mixture taken at 5- or 10-minute intervals until one of these samples hydrophobes upon dilution with 50 times its volume of water at 20° C. When the sample becomes cloudy, the reaction has proceeded too far; and the reaction time should be decreased between about 20 and about 80%—a decrease of about one-third being generally recommended. To produce suitable resins, it is essential that this reaction be halted at the proper point, as materials which have been reacted to the stage where they will either crystallize or hydrophobe do not accomplish the desired results. The reaction is readily stopped by adjusting the pH of the mixture to a neutral or alkaline value. The range 7.0 to 8.5 is preferred. In addition, the reaction mixture is usually cooled. Where a more highly concentrated resin is required, this may be accomplished by vacuum distillation at temperatures below about 55° C. to avoid further condensation of the reaction mixture.

It is thought that the reaction products disclosed herein are essentially monomeric in nature, except where the urea derivative is introduced in the partially polymerized state, because it is unlikely that the solubility characteristics obtained could be secured with higher polymers. Nevertheless, it is possible that the present resins contain appreciable and perhaps even major proportions of low-order condensation polymers, such as dimers, trimers, etc., under the severest reaction conditions described herein.

Conventional equipment is employed in impregnating and curing the resin blends on the various textile materials. A pad bath is recommended for the application of the resin, and this bath is desirably maintained at a temperature between 40 and 100° F. The degree of treatment is controlled in known manner by suitable adjustment of the bath concentration and the pressure exerted on the squeeze rolls. For a flame-retardant finish, the thiourea content of the resin applied to the fabric should be at least 5% based on the dry untreated weight of light-weight open-mesh nylon-containing fabrics; and the recommended range is 7.5 to 12%. Where a stiff hand is sought on such fabrics, the total dry resin add-on should amount to at least 20% of the fabric weight and desirably more than 50%. While dry pickups of 100% and more are also contemplated, it is not thought that such heavy deposits will often be desirable in commercial usage. The recommended treatments require a concentrated pad bath when a conventional 80 to 100% wet pickup is used; and this points up the need for a resin pad bath of the present type, where in the thiourea derivative is stable for long periods at high concentrations. Where a tightly woven or knitted nylon fabric is being treated, the resin deposit on the cloth should amount to between 0.5 and 40% of the fabric weight; larger pickups increase the fire resistance of the fabric at least in the lower part of the stated range. The content of thiourea, substantially all of which is in combined form, in such resin deposits will amount to at least 0.1% of the untreated cloth weight.

The impregnated textile material is dried and cured in the usual manner to the water insoluble state, and these operations are frequently combined for simplicity. In order to cure the resin blend, it is recommended that the fabric be exposed to temperatures of between 250 and 350° F. for a period of 0.5 to 5 minutes, and radiant heating at temperatures up to 900° F. is contemplated for curing light-weight fabrics in as little as 5 seconds.

PREPARATION OF RESINS

Resin A

To a suitable vessel equipped with an agitator, thermometer, heating means, and reflux condenser are charged 53.0 gram mols of formaldehyde as paraformaldehyde, 4.8 mols of thiourea, 40.0 mols of methanol, 7.3 mols of water, and 19.2 ml. of 50% triethanolamine. After heating to reflux, the reaction mixture is refluxed for 30 minutes, whereupon 19.2 mols of urea are added. Refluxing is continued for an additional two hours; the pH is 7.4. The reaction mixture is then acidified to pH 5.3 with 5 N formic acid, refluxed for one hour, neutralized with sodium hydroxide, cooled and filtered.

Resin B

To a similarly equipped flask are charged 12.6 gram mols of methanol, 12.0 mols of thiourea, 14.4 mols of formaldehyde together with 12 ml. of 50% aqueous triethanolamine. This mixture has a pH of 8.9 and is held at 50° C. for two hours. Then it is acidified to a pH of 5.2 with 5 N formic acid and maintained at 50° C. for an additional hour. Thereafter the reaction product is neutralized, cooled and filtered to produce a standard thiourea resin syrup.

To another similarly equipped flask is charged a mixture of 2.1 mols of 37% aqueous formaldehyde and 1 mol of urea. With the pH adjusted to approximately 8.0, this mixture is heated at about 100° C. for 30 minutes, followed by maintaining the same temperature for an additional 1 to 3 hours with the pH adjusted to 5.3 to 5.5 until the reaction mass has a viscosity of 32 centipoises at 20° C. Next, the mixture is neutralized with 10 N sodium hydroxide, cooled, filtered and concentrated to 85% solids under a vacuum of 20 inches of mercury with gentle heating up to 60° C. The resulting standard urea resin syrup is essentially a concentrated aqueous resin dispersion of partially polymerized dimethylol urea which is freely dilutable with water.

Resin B is prepared by thoroughly mixing 46 parts of the standard thiourea syrup and 54 parts of the standard urea resin syrup.

Resin C

The same equipment is used in refluxing for 20 minutes a mixture of 2.0 mols of urea, 6.1 mols of paraformaldehyde, 3.3 mols of water and 0.8 mol of thiourea. After cooling to 80° C., 4.7 mols of methanol is added and the pH of the reaction mass is adjusted to 5.6 with 5 N formic acid. This combination is refluxed for one more hour and then neutralized, cooled and filtered.

Resin D

This is a blend of 40 parts of the standard thiourea resin syrup and 60 parts of the standard urea resin syrup, as described in connection with Resin B.

Resin E

The composition of this resin is a mixture of 34.5 parts of the standard thiourea resin syrup and 65.5 parts of the standard urea resin syrup described in regard to Resin B.

Resin F

A blend is made of 23 parts of the thiourea resin syrup and 77 parts of the standard urea resin syrup described in Resin B.

Resin G

This resin composition is prepared by thoroughly mixing 20 parts of the standard thiourea resin syrup and 80 parts of the standard urea resin syrup described in the preparation of Resin B.

Resins H, I, J, and K

These resins are prepared according to the same procedure of Resin A, using varying quantities as reactants in accordance with the data set forth in the table below.

Resin L

To a reaction vessel of the type described above are charged 18.7 mols of paraformaldehyde, 8.3 mols of urea and 11.0 mols of methanol. These materials are reacted at 85° C. and a pH of 8.2 to 8.4 for 2¾ hours. Then 33 mols of methanol and sufficient oxalic acid are added to lower the pH to 2.7 to 3.0, followed by reacting for 30 minutes more. The mixture is then made alkaline with 10 N aqueous sodium hydroxide concentrated to 81% solids under vacuum, cooled and filtered. The resulting syrup is a dispersion of methylated partially polymerized dimethylol urea which has a calculated total formaldehyde content of 39.4% and urea content of 35.6% by weight. Fifty-four (54) parts by weight of the above syrup and 46 parts of the standard thiourea resin syrup described in connection with Resin B are blended in preparing Resin L.

Resin M

Into a reaction vessel of the type described are introduced 13.3 mols of water, 2.5 mols of methanol, 7.3 mols of urea, 4.5 grams of triethanolamine (80% technical grade) and 18.2 mols of paraformaldehyde. The batch is heated to reflux (100° C.) and maintained there for 30 minutes; the pH is 8.3. Next, the pH is lowered to 5.2 by adding 5 N formic acid and refluxing is continued for one hour, after which the pH is raised to 7.1 with 5 N aqueous sodium hydroxide. After cooling to 70° C., 7.8 mols of methanol and 3.0 mols of thiourea are charged, which reduces the temperature of the mixture to 50 to 55° C. This temperature is maintained for 30 minutes; the pH is 7.6. With 5 N formic acid, the pH of the batch is now adjusted to 5.2, and the same temperature is maintained for one more hour. Next, the pH is raised to 8.0 with 5 N sodium hydroxide solution, and the reaction mixture is cooled to 38 to 40° C., filtered, and concentrated under vacuum at temperatures below 50° C. to 80% solids. The resulting clear syrup has a thiourea content of 15% by weight.

The catalyst concentration in the table below is expressed in terms of anhydrous ingredients even though a number of the following accelerators are customarily supplied as about 30% solutions in water.

Catalyst R is 2-methyl 2-amino propanol-1 hydrochloride.

Catalyst S is a combination of 24.6 parts of mixed isopropanolamines and 17.6 parts by weight of concentrated hydrochloric acid (22° Baumé).

Catalyst T is magnesium chloride.
Catalyst U is ammonium bromide.
Catalyst V is ammonium chloride.
Catalyst Y is ammonium sulfate.
Catalyst Z is a mixture of 94% diammonium hydrogen phosphate and 6% hexamethylene tetramine.

For a better understanding of the nature and objects of this invention, reference should be had to the accompanying examples in which all proportions are set forth in terms of weight unless specified otherwise therein.

EXAMPLES 1 TO 57

Pad baths containing a resin blend and catalyst of the nature described hereinbelow are mixed with a sufficient quantity of water to produce a bath of the composition set forth in the table hereinbelow. Nylon (adipamide type) marquisette is padded through this solution at 70° F. with the squeeze rolls set for 100% wet pickup and is then stretched out on a pin frame with tension. The sample is dried and cured in one operation for 1.25 minutes in an oven maintained at 340° F. The finished fabrics have a desirably stiff hand. All samples are found to have a high degree of flame resistance in contrast to the same fabric treated with the corresponding urea resin alone with the same add-on. A simple arbitrary test for flammability is employed. This consists of rolling up a 4-inch square swatch of the treated fabric into a relatively tight cylinder and applying a lighted match to the center of this roll while the ends are held. After the roll has burned through, the match is withdraw; and an observation is made as to whether the flame on the fabric is extinguished.

Table

| Example No. | Resin | Mols Charged,[1] F:TU+U | Catalyst | Pad Bath Concentration | | | | Afterflaming In Roll Test |
|---|---|---|---|---|---|---|---|---|
| | | | | Percent Cat. | Percent Resin Solids | Percent Thiourea | Percent Urea | |
| 1 | C | 2.2:1 | None | ---- | 50.2 | 6.2 | 26.2 | Yes. |
| 2 | A | 2.2:1 | U | 1.0 | 50.2 | 5.4 | 16.9 | No. |
| 3 | B | 1.7:1 | U | 1.3 | 64.0 | 18.4 | 17.0 | No. |
| 4 | B | 1.7:1 | Z | 1.3 | 64.0 | 18.4 | 17.0 | Yes. |
| 5 | A | 2.2:1 | Z | 1.7 | 50.2 | 5.4 | 16.9 | Yes. |
| 6 | A | 2.2:1 | V | 1.75 | 50.2 | 5.4 | 16.9 | No. |
| 7 | A | 2.2:1 | U | 1.75 | 50.2 | 5.4 | 16.9 | No. |
| 8 | C | 2.2:1 | U | 1.8 | 50.2 | 6.2 | 26.2 | No. |
| 9 | C | 2.2:1 | Z | 1.8 | 50.2 | 6.2 | 26.2 | Yes. |
| 10 | B | 1.7:1 | T | 0.54 | 64.0 | 18.4 | 17.0 | No. |
| 11 | B | 1.7:1 | S | 0.54 | 64.0 | 18.4 | 17.0 | No. |
| 12 | B | 1.7:1 | R | 0.54 | 64.0 | 18.4 | 17.0 | No. |
| 13 | B | 1.7:1 | S | 1.92 | 64.0 | 18.4 | 17.0 | No. |
| 14 | B | 1.7:1 | R | 1.92 | 64.0 | 18.4 | 17.0 | No. |
| 15 | B | 1.7:1 | S | 3.74 | 64.0 | 18.4 | 17.0 | No. |
| 16 | B | 1.7:1 | R | 3.74 | 64.0 | 18.4 | 17.0 | No. |
| 17 | D | 1.7:1 | V | 0.65 | 64.0 | 16.0 | 19.0 | No. |
| 18 | D | 1.7:1 | U | 1.3 | 64.0 | 16.0 | 19.0 | No. |
| 19 | D | 1.7:1 | S | 0.54 | 64.0 | 16.0 | 19.0 | No. |
| 20 | D | 1.7:1 | R | 0.54 | 64.0 | 16.0 | 19.0 | No. |
| 21 | D | 1.7:1 | Y | 0.56 | 64.0 | 16.0 | 19.0 | Yes. |
| 22 | D | 1.7:1 | Z | 0.56 | 64.0 | 16.0 | 19.0 | Yes. |
| 23 | D | 1.7:1 | Y | 1.12 | 64.0 | 16.0 | 19.0 | Yes. |
| 24 | D | 1.7:1 | Z | 1.12 | 64.0 | 16.0 | 19.0 | Yes. |
| 25 | D | 1.7:1 | Y | 2.24 | 64.0 | 16.0 | 19.0 | Yes. |
| 26 | D | 1.7:1 | Z | 2.24 | 64.0 | 16.0 | 19.0 | Yes. |
| 27 | E | 1.8:1 | U | 1.3 | 65.0 | 13.8 | 20.6 | No. |
| 28 | E | 1.8:1 | V | 1.3 | 65.0 | 13.8 | 20.6 | No. |
| 29 | E | 1.8:1 | R | 0.54 | 65.0 | 13.8 | 20.6 | No. |
| 30 | E | 1.8:1 | S | 0.54 | 65.0 | 13.8 | 20.6 | No. |
| 31 | E | 1.8:1 | T | 0.54 | 65.0 | 13.8 | 20.6 | No. |
| 32 | E | 1.8:1 | T | 1.92 | 65.0 | 13.8 | 20.6 | No. |
| 33 | E | 1.8:1 | R | 1.92 | 65.0 | 13.8 | 20.6 | No. |
| 34 | E | 1.8:1 | S | 1.92 | 65.0 | 13.8 | 20.6 | No. |
| 35 | E | 1.8:1 | R | 3.84 | 65.0 | 13.8 | 20.6 | No. |
| 36 | E | 1.8:1 | S | 3.84 | 65.0 | 13.8 | 20.6 | No. |
| 37 | F | 1.9:1 | U | 1.3 | 66.0 | 9.2 | 24.4 | No. |
| 38 | F | 1.9:1 | V | 1.3 | 66.0 | 9.2 | 24.4 | No. |
| 39 | F | 1.9:1 | R | 0.54 | 66.0 | 9.2 | 24.4 | No. |
| 40 | F | 1.9:1 | S | 0.54 | 66.0 | 9.2 | 24.4 | No. |
| 41 | F | 1.9:1 | T | 3.84 | 66.0 | 9.2 | 24.4 | No. |
| 42 | G | 1.9:1 | V | 0.65 | 66.0 | 8.0 | 25.4 | No. |
| 43 | G | 1.9:1 | U | 1.3 | 66.0 | 8.0 | 25.4 | No. |
| 44 | G | 1.9:1 | S | 0.54 | 66.0 | 8.0 | 25.4 | No. |
| 45 | G | 1.9:1 | R | 0.54 | 66.0 | 8.0 | 25.4 | No. |
| 46 | B | 1.7:1 | U | 1.28 | 64.0 | 18.4 | 17.0 | No. |
| 47 | A | 2.2:1 | U | 1.75 | 50.2 | 5.4 | 16.9 | No. |
| 48 | H | 2.2:1 | V | 1.75 | 50.2 | 6.7 | 15.9 | No. |
| 49 | H | 2.2:1 | U | 1.75 | 50.2 | 6.7 | 15.9 | No. |
| 50 | I | 2.2:1 | V | 1.75 | 50.2 | 8.9 | 14.2 | No. |
| 51 | I | 2.2:1 | U | 1.75 | 50.2 | 8.9 | 14.2 | No. |
| 52 | J | 2.2:1 | V | 1.75 | 50.2 | 10.3 | 13.3 | No. |
| 53 | J | 2.2:1 | U | 1.75 | 50.2 | 10.3 | 13.3 | No. |
| 54 | K | 2.2:1 | V | 1.75 | 50.2 | 13.3 | 10.3 | No. |
| 55 | K | 2.2:1 | U | 1.75 | 50.2 | 13.3 | 10.3 | No. |
| 56 | L | 1.7:1 | U | 1.28 | 64.0 | 18.4 | 15.4 | No. |
| 57 | L | 1.7:1 | V | 1.28 | 64.0 | 18.4 | 15.4 | No. |

[1] Molar ratio of formaldehyde to the total of thiourea and urea charged in preparing the resin.

EXAMPLE 58

A pad bath is prepared with a content of 8.2% by weight of Resin D solids and 0.17% ammonium bromide. Green-dyed nylon twill of 1.8-ounce and 3-ounce weights is padded through this bath with the wet pickup set at about 40%. After drying at 225° F. and curing for 3 minutes at 325° F., the dry add-on is found to be 3.2%. The two treated samples and two untreated controls are hung vertically and exposed to a match flame. All of the materials melt in contact with the flame and drip; but there is no afterflaming of the resin-treated samples, whereas the control swatches both support combustion.

EXAMPLE 59

The procedure of Example 58 is repeated with a pad bath of double the concentration in order to obtain an add-on of 6.4% Resin D solids. The same results are obtained upon application of a match to vertically hung treated and untreated swatches of the two fabrics.

EXAMPLE 60

Nylon oxford tent fabric is padded through a bath containing 49.6% Resin M solids and 1.0% ammonium bromide according to the procedure of Example 58. The resin add-on is 20.0%. No afterflaming is encountered in a match test of the treated sample, while an untreated control continues to burn after the removal of the match. In both tests, the nylon fibers in the flame melt and drip off the fabric.

EXAMPLE 61

The same nylon oxford tent fabric is treated by the procedure of Example 58 in a bath containing 4.2% of Resin B solids and 0.08% of ammonium bromide to produce a dry pickup of 1.6%. Upon application of the match test to the vertically hung fabric, the material melts and drips but does not continue to burn after the removal of the match.

EXAMPLE 62

The same nylon oxford tent fabric is treated by the procedure of Example 58 in a bath containing 50% of Resin B solids and 1.0% of ammonium bromide to produce a dry pickup of 20.5%. Upon application of the match test to the vertically hung fabric, the material melts and drips but does not continue to burn after the removal of the match.

While there are above disclosed only a limited number of the embodiments of the process and the product of the invention hereinpresented, it is possible to produce still other embodiments without departing from the in-

What we claim is:

1. A process for imparting fire-retardant properties to a textile material containing at least 20% of nylon fibers comprising impregnating said textile material with an aqueous solution of a halide salt curing agent and hydrophilic, thermosetting products of reacting at a temperature above about 45° C. and a pH between about 4.0 and about 6.0, a water-soluble, aliphatic, monohydric alcohol containing 1 to 3 carbon atoms, and a hydrophilic formaldehyde condensate of thiourea, said alcohol and formaldehyde condensate of thiourea being reacted in relative proportions of at least about 0.4 mol of alcohol per mol on a monomeric basis of said formaldehyde condensate of thiourea, in which the reaction is halted after a substantial amount of alcohol has reacted and before a sample of the reaction mixture hydrophobes upon dilution with 50 volumes of water at 20° C., and a hydrophilic water-soluble urea derivative of the group consisting of monomers and lower polymers of methylol ureas and lower alkyl ethers of methylol ureas, wherein said urea derivative has a urea content between about 0.6 and about 7.0 parts by weight per part of thiourea, the total formaldehyde content of the mixture is between about 1.0 and 2.3 mols of formaldehyde per mol of urea and thiourea on a monomeric basis, and wherein from between about 0.1 and 1.8 mols of alcohol are combined per total mols of thiourea and urea taken, and heating the impregnated textile material to cure said products to the water-insoluble state.

2. A textile material which comprises the heat-cured reaction product of a process according to claim 1.

References Cited in the file of this patent

UNITED STATES PATENTS

| | | |
|---|---|---|
| 2,329,651 | Powers et al. | Sept. 14, 1943 |
| 2,485,080 | Wohnsiedler et al. | Oct. 18, 1949 |
| 2,585,961 | Burnell et al. | Jan. 22, 1952 |
| 2,601,665 | Niles | June 24, 1952 |
| 2,645,625 | Bonzagni | July 14, 1953 |
| 2,681,326 | Christianson | Feb. 15, 1954 |

UNITED STATES PATENT OFFICE
CERTIFICATION OF CORRECTION

Patent No. 2,922,726                          January 26, 1960

Louis J. Moretti et al.

It is hereby certified that error appears in the above numbered patent requiring correction and that the said Letters Patent should read as corrected below.

Column 2, line 38, for "basic" read -- basis --.

Signed and sealed this 23rd day of May 1961.

(SEAL)
Attest:

ERNEST W. SWIDER                          DAVID L. LADD
Attesting Officer                            Commissioner of Patents